US012680030B2

(12) United States Patent　　(10) Patent No.:　US 12,680,030 B2
Tijani et al.　　　　　　　　　　(45) Date of Patent:　　Jul. 14, 2026

(54) FURNACE FOR CRACKING HYDROCARBONS AND METHOD OF OPERATION THEREFOR

(71) Applicant: Nederlandse Organisatie voor toegepast-natuurwetenschappelijk Onderzoek TNO, 's Gravenhage (NL)

(72) Inventors: Moulay El Hassan Tijani, 's Gravenhage (NL); Herman Albert Zondag, 's Gravenhage (NL); Yvonne Christine Van Delft, 's Gravenhage (NL)

(73) Assignee: Nederlandse Organisatie voor toegepast-natuurwetenschappelijk Onderzoek TNO, 's Gravenhage (NL)

( * ) Notice: Subject to any disclaimer, the term of this patent is extended or adjusted under 35 U.S.C. 154(b) by 130 days.

(21) Appl. No.: 18/291,256

(22) PCT Filed: Aug. 1, 2022

(86) PCT No.: PCT/EP2022/071581
　　§ 371 (c)(1),
　　(2) Date: Jan. 23, 2024

(87) PCT Pub. No.: WO2023/007033
　　PCT Pub. Date: Feb. 2, 2023

(65) Prior Publication Data
　　US 2024/0271047 A1　　Aug. 15, 2024

(30) Foreign Application Priority Data
　　Jul. 30, 2021　(EP) ..................................... 21188833

(51) Int. Cl.
　　*C10G 9/20*　　　　(2006.01)
　　*B01J 19/00*　　　　(2006.01)
　　　　　　　　(Continued)

(52) U.S. Cl.
　　CPC ............ *C10G 9/20* (2013.01); *B01J 19/0013* (2013.01); *B01J 19/08* (2013.01); *B01J 19/2415* (2013.01);
　　　　　　　　(Continued)

(58) Field of Classification Search
　　CPC .... B01J 19/0013; B01J 19/08; B01J 19/2415; B01J 2219/00157; B01J 2219/0871; C10G 2300/4075; C10G 9/16; C10G 9/20
　　See application file for complete search history.

(56) References Cited

U.S. PATENT DOCUMENTS 5,846,496 A　*　12/1998　Bellet ..................... B08B 9/027
　　　　　　　　　　　　　　　　　　　　422/204
5,873,408 A　　2/1999　Bellet et al.

FOREIGN PATENT DOCUMENTS

EP　　　3805667 A1　*　4/2021　.............. F25B 9/145
JP　　2010071238 A　　4/2010

* cited by examiner

*Primary Examiner* — Ellen M Mcavoy
*Assistant Examiner* — Chantel Graham
(74) *Attorney, Agent, or Firm* — Ipsilon USA—NLO

(57) ABSTRACT

A furnace configured for cracking hydrocarbons includes a furnace internal volume and one or more tubes; the internal volume includes at least a high temperature volume and is arranged with a heat source configured for heating the high temperature volume during operation. The tubes, each with an entry portion connect to an external inlet on one side and an exit portion connectable to an external outlet at another side of the respective tube, and pass through the high temperature volume in the internal volume, such that during operation the tubes in the high temperature volume are exposed to heat from the heat source. The furnace includes a thermoacoustic engine source for generating acoustic waves and guiding the acoustic waves into the furnace internal volume. Alternatively, the furnace is configured for (Continued)

generating oscillating acoustic waves in the interior of the tubes by means of a thermal gradient along the tubes.

14 Claims, 3 Drawing Sheets

(51) Int. Cl.
  *B01J 19/08*         (2006.01)
  *B01J 19/24*         (2006.01)
(52) U.S. Cl.
  CPC ................. *B01J 2219/00157* (2013.01); *B01J 2219/0871* (2013.01); *C10G 2300/4075* (2013.01)

FURNACE FOR CRACKING HYDROCARBONS AND METHOD OF OPERATION THEREFOR

FIELD OF THE INVENTION

The invention relates to a furnace for cracking hydrocarbons. Also the invention relates to a method for operating such a furnace. Moreover, the invention relates to a method for manufacturing such a furnace.

BACKGROUND

Pyrolysis of hydrocarbon feedstock at high temperature is used in chemical processes to transform large hydrocarbon molecules into smaller molecules. Such chemical processes are often described as 'thermal cracking'. The hydrocarbon feedstock is made to flow through a volume at high temperature, typically an arrangement of reactor tubes in a furnace. During passage through the tubes the pyrolysis reaction takes place.

Thermal cracking of hydrocarbon feedstock is usually accompanied by coke formation in which solid carbon ('coke') containing layer deposits are created on the inside walls of the reactor tubes. For example at given operating conditions the coke formation in the pyrolysis of naphtha is about 0.01 wt % of the feedstock.

Coke formation can occur also at an outlet side of the tubes from the furnace in a transfer line exchanger (TLE) which is used for the rapid quench of products from the thermal cracking process in the furnace.

The coke formation has adverse effect on the pyrolysis process as the coke layer decreases the heat transfer from the tube to the hydrocarbon feedstock. Therefore, to maintain a constant reaction temperature, the thermal power delivered by the oven has to be increased with increasing coke layer thickness. This results in a raise of the tube wall temperature which might exceed the designed skin temperature of the tubes. This overheating causes a premature ageing of the tubular reactor.

The coke layer reduces also the cross-sectional flow area of the tube which results in an increase of the pressure drop and a reduction of the residence time. The result is a reduction of the conversion efficiency and the yield of the pyrolysis process.

To maintain a pyrolysis process with sufficient yield and efficiency it is necessary that a decoking process to remove the coke layer is performed on a regular basis. Usually, the decoking process consists of burning out the deposited coke with a mixture of steam and air. To this end a steam-air mixture is introduced into the tubes to burn out the coke at about 800° C.

The time intervals for decoking depend upon several factors including the type of furnace, how the process is operated, feedstock type, and the types of tubes utilised. The decoking of the tubes in the thermal cracking reactor and if present, the thermal line exchanger (TLE) usually takes about 36 h. Mechanical decoking is also possible but it typically takes 4-7 times longer than steam-air based decoking.

It is worthwhile to notice that a large emission of $CO_2$ is produced by steam-air decoking processes. The down time of the thermal cracking reactor results in a reduction of the production.

Many methods are developed to minimise the deposition of coke. The techniques commonly used today to reduce coke formation include the pretreatment of feedstocks, a change in the materials used in the construction of the reactor, alteration of the surface chemistry of the reactor tubes, or the addition of coke inhibitors to the feedstock. All of these methods limit but do not completely suppress coke deposition.

U.S. Pat. No. 5,846,496 discloses a method that uses the vibration of the reactor tubes to limit the deposition of coke. The tubes are vibrated using a mechanical source or by subjecting the tubes to sound waves that are created by the flames of the burners that heat the reactor tubes in the furnace. By adapting the composition of the fuel supplied to the burners the burners can be made to produce sound waves.

A difficulty of the latter method is that the furnace is a high temperature environment where a mechanical acoustic source which has a small temperature resistance, is prone to heat damage and can not survive at high temperature for a long time. The effect of the adaptation of the fuel composition affects the heat production which makes the heating process less efficient.

It is an object of the present invention to overcome or mitigate one or more of the detrimental effects from the prior art.

SUMMARY OF THE INVENTION

The object is achieved by a furnace configured for cracking hydrocarbons comprising a furnace internal volume and one or more tubes;

the furnace internal volume comprising at least a high temperature volume and arranged with a heat source configured for heating the high temperature volume during operation;

the tubes, each with an entry portion connectable to an external inlet on one side and an exit portion connectable to an external outlet at another side of the respective tube, arranged to pass through the high temperature volume in the furnace internal volume, such that during operation the tubes in the high temperature volume are exposed to heat from the heat source;

wherein the furnace is an acoustic resonance system comprising a thermoacoustic engine configured as a source for generating acoustic waves in the furnace internal volume with a frequency of the acoustic waves that substantially corresponds with a resonance frequency of the furnace internal volume.

A solution to the problems of the prior art is to set-up the furnace as an acoustic resonance system which uses a thermoacoustic engine as an acoustic source to generate vibration of the tubes which has a beneficial effect on the removal of coke deposited inside the tubes.

According to an embodiment, the one or more tubes are configured to vibrate in response to the acoustic waves in the furnace internal volume. The tubes are mounted in the furnace internal volume in a manner that vibration of the tubes can occur when exposed to the acoustic waves.

The thermoacoustic engine comprises a thermoacoustic core in which thermal power is converted to acoustic power. The thermoacoustic core comprises a stack of a high-temperature heat exchanger, a low-temperature heat exchanger and a regenerator, in which the regenerator is located between the high-temperature and low-temperature heat exchangers. Advantageously, heat from the furnace internal volume is used to create a temperature gradient between the high-temperature and low-temperature heat exchangers across the regenerator. In the regenerator a thermoacoustic conversion takes place to generate acoustic waves.

The thermoacoustic engine is connected to the furnace internal volume of the thermal cracker reactor in a manner that the acoustic waves created by the thermoacoustic engine enter the furnace internal volume, travel through the furnace internal volume using the flue gases as transport medium and cause vibration of the tube(s) in which the cracking process takes place. The vibration suppresses coke deposition on the inner wall of the tube(s) which has the effect that the coke formation process is avoided or strongly reduced.

The application of a thermoacoustic engine in the cracker furnace also is beneficial since the thermoacoustic engine has relatively higher temperature resistance with less risk of damage in comparison with the vibration mechanisms offered by the prior art.

The thermoacoustic engine is configured/designed in a manner that a frequency of the acoustic waves generated by the thermoacoustic engine substantially matches the resonance frequency of the reactor volume to enhance vibrations in the tube(s). In an alternative embodiment, the object is achieved by a furnace, configured for cracking hydrocarbons comprising at least an internal volume defining a high temperature volume and one or more tubes; the internal volume comprising at least a high temperature volume; the internal volume arranged with a heat source configured for heating the high temperature volume during operation;

the tubes, each with an entry portion connectable to an external inlet and an exit portion connectable to an external outlet, arranged to pass through the high temperature volume, such that during operation the tubes in the high temperature volume are exposed to heat from the heat source;

wherein the furnace is configured for creating during operation a temperature gradient along at least a portion of a length of the one or more tubes between the entry portion and the exit portion of each tube, with a temperature of the entry portion lower than the temperature of the exit portion, in which a tube diameter is dimensioned as a function of the tube length, a high-to-low temperature ratio for the given thermal gradient and a composition of the hydrocarbons such that oscillating acoustic waves are generated in the interior of the respective tube.

The one or more tubes through which the hydrocarbons flow are subjected to a temperature gradient along the length of the tube, and the temperature gradient causes acoustic oscillations within the tube that interact with present coke depositions i.e., suppress and/or remove coke depositions from the interior wall of the tubes.

According to an aspect, the invention relates to a method of operation for a furnace configured for cracking hydrocarbons comprising a furnace internal volume and one or more tubes; the furnace internal volume comprising at least a high temperature volume and configured with a heat source for heating the high temperature volume during operation; the tubes, each with an entry portion connectable to an external inlet on one side and an exit portion connectable to an external outlet at another side of the respective tube, arranged to pass through the high temperature volume, such that during operation the tubes in the high temperature volume are exposed to radiative heat; the method comprising: providing a thermoacoustic engine coupled to the high-temperature volume and controlling the thermoacoustic engine to generate acoustic waves for transmission into the furnace internal volume for exposing the one or more tubes to the generated acoustic waves, with a frequency of the acoustic waves that substantially corresponds with a resonance frequency of the furnace internal volume.

According to an aspect, the invention relates to method for manufacturing a furnace configured for cracking hydrocarbons comprising:

creating at least a furnace internal volume comprising at least a high temperature volume arranged with a heat source; arranging one or more tubes in the furnace internal volume, each with an entry portion connectable to an external inlet on one side and an exit portion connectable to an external outlet at another side of the respective tube, the one or more tubes configured to pass through the high temperature volume; providing a thermoacoustic engine connected to the furnace internal volume and configured as a source for providing acoustic waves into at least the high temperature volume during operation, so as to expose the one or more tubes to the acoustic waves.

According to an aspect, the invention relates to a method of operation for a furnace configured for cracking hydrocarbons comprising an internal volume and one or more tubes; the internal volume comprising at least a high temperature volume and configured with a heat source for heating the high temperature volume during operation;

each tube having an entry portion connectable to an external inlet on one side configured for receiving an input flow of hydrocarbons and an exit portion connectable to an external outlet configured for output of cracked hydrocarbons at another side of the respective tube, and each tube arranged to pass through the high temperature volume;

the method comprising: providing the input flow of hydrocarbons at the entry portion to flow towards the exit portion; and providing a temperature gradient over at least a longitudinal portion of each tube between the one side and the other side thereof, in which a tube diameter is configured for causing the tube to generate thermo-acoustical oscillations, with a critical tube diameter value d, which allows sustaining acoustical oscillations within the tube, by dimensioning the tube diameter as a function of the tube length, a high-to-low temperature ratio for the given temperature gradient and a composition of the hydrocarbons so as to generate acoustic waves in the respective tube.

a method for operating a furnace for cracking hydrocarbons.

According to another aspect, the invention relates to a method for manufacturing a furnace configured for cracking hydrocarbons comprising:

creating at least an internal volume comprising at least a high temperature volume arranged with a heat source; arranging one or more tubes in the internal volume, each with an entry portion connectable to an external inlet on one side and an exit portion connectable to an external outlet at another side of the respective tube, the one or more tubes configured to pass through the high temperature volume; configuring the internal volume as a generator for providing a thermal temperature gradient over at least a portion of the one or more tubes during operation, in which a tube diameter is configured for causing thermo-acoustical oscillations in the tube by dimensioned dimensioning the tube diameter as a function of the tube length, a high-to-low temperature ratio for the given thermal temperature gradient and a composition of the hydrocarbons so as to generate acoustic waves within the respective tube.

Advantageous embodiments are further defined by the dependent claims.

BRIEF DESCRIPTION OF DRAWINGS

The invention will be explained in more detail below with reference to drawings in which illustrative embodiments thereof are shown. The drawings are intended exclusively for illustrative purposes and not as a restriction of the inventive concept. The scope of the invention is only limited by the definitions presented in the appended claims.

In the drawings, similar or corresponding elements, features or structures are indicated by the same reference signs. The drawings are schematic and not intended to be on scale.

DETAILED DESCRIPTION OF EMBODIMENTS

Figure 1:
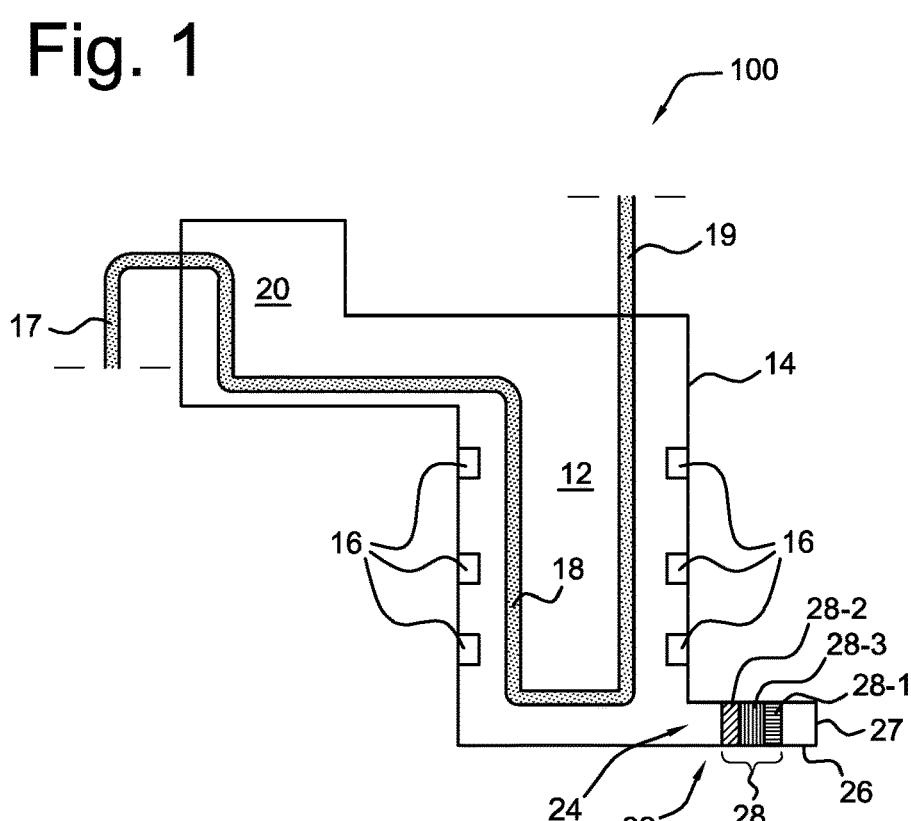
FIG. 1 shows a cross-section of a furnace for cracking hydrocarbons according to an embodiment.

FIG. 1 shows a cross-section of a furnace 100 for cracking hydrocarbons according to an embodiment.

The furnace 100 of FIG. 1 relates to a cracker furnace (thermal cracking reactor) in which a hydrocarbon feedstock of relatively large molecules is converted in "product" consisting of predominantly small hydrocarbon molecules. During operation, the feedstock is pumped through one or more reactor tubes 18 that are arranged in a high-temperature volume 12, in the internal volume of the cracker furnace (furnace internal volume) such that in the reactor tubes a high-temperature zone is present. Typically, the high-temperature volume is configured to be heated to such temperatures that a radiation zone is created in the high-temperature volume. The reactor tubes in the high-temperature volume are thus heated by radiative heat transfer. During the flow of the feedstock through the reactor tubes the cracking process takes place.

The furnace comprises an outer wall 14 which defines the furnace internal volume. In some embodiments, the furnace internal volume is divided into at least two zones: the high-temperature volume 12 (as explained above: the radiation zone of the furnace) where the temperature during operation is sufficiently high for the cracking process and one or more lower temperature volumes 20, also known as convection zones.

The walls 14 of the high-temperature volume 12 are provided with heat sources such as (gas) burners 16 or electrical heat sources. Inside the high-temperature volume the one or more reactor tubes 18 are laid out in a "coil" arrangement to have a relatively long stretch in the high-temperature volume with sufficient residence time of the hydrocarbon feedstock to allow the cracking process to take place. The reactor tubes 18 are mounted in the high-temperature volume in a manner that vibration of the reactor tubes can occur.

According to the embodiment, the furnace 100 comprises a thermoacoustic engine 22 for producing acoustic waves. The thermoacoustic engine 22 comprises an acoustic resonator tube 26 and a thermoacoustic core 28 for generating the acoustic waves with the thermoacoustic core arranged inside the acoustic resonator tube. An open end of the acoustic resonator tube 26 is connected to the furnace internal volume through a first opening 24 in a portion of the walls 14 surrounding the furnace internal volume 12.

In an embodiment, the first opening 24 is arranged in the walls surrounding the high-temperature volume or radiation zone of the furnace.

In an alternative embodiment, the first opening 24 is arranged in the walls surrounding the lower temperature volume, or convection zone of the furnace.

The thermoacoustic core 28 comprises an arrangement of high-temperature heat exchanger 28-1, a low-temperature heat exchanger 28-2 and a regenerator 28-3, in which the regenerator 28-3 is located between the high-temperature and low-temperature heat exchangers 28-1, 28-2.

The thermoacoustic engine 22 in this embodiment is of a type for producing standing acoustic waves. A distal end 27 of the acoustic resonator tube 26 is closed.

The thermoacoustic engine 22 produces acoustic waves that enter the furnace internal volume through the first opening in the walls 14 and travel through the furnace internal volume.

In an embodiment the thermoacoustic engine 22 is designed to create acoustic waves with a frequency that corresponds with a resonance frequency of the furnace internal volume.

According to the invention the combination of the thermoacoustic engine 22 and the furnace internal volume is configured to generate a frequency of the produced acoustic waves that causes vibration of the one or more tubes 18 in the furnace internal volume. The vibration of the tubes 18 caused by the acoustic waves has the effect to reduce or remove the need for 'decoking' of the inner walls of the tubes.

Optionally, the reactor tubes can also be designed to have a resonance frequency that substantially corresponds with the resonance frequency of furnace coupled to the thermoacoustic engine 22.

The one or more lower temperature volumes 20 are arranged at an end of the high-temperature volume in a manner that during operation the local temperature therein is lower than in the high-temperature volume 12, for example by using a bend that prevents a direct exposure of the low-temperature volumes to radiation originating from the high-temperature volume.

In the lower temperature volumes 20, the inlet portion 17 of the tube(s) 18 is located. Also, the lower temperature volumes 20 provide an outlet for flue gases from the high-temperature volume and may comprise so-called tubes banks (not shown) for heat recovery from the flue gases produced by the gas burners 16. The outlet portion(s) 19 of the tube(s) are located in the high temperature volume 12 of the furnace.

Figure 2:
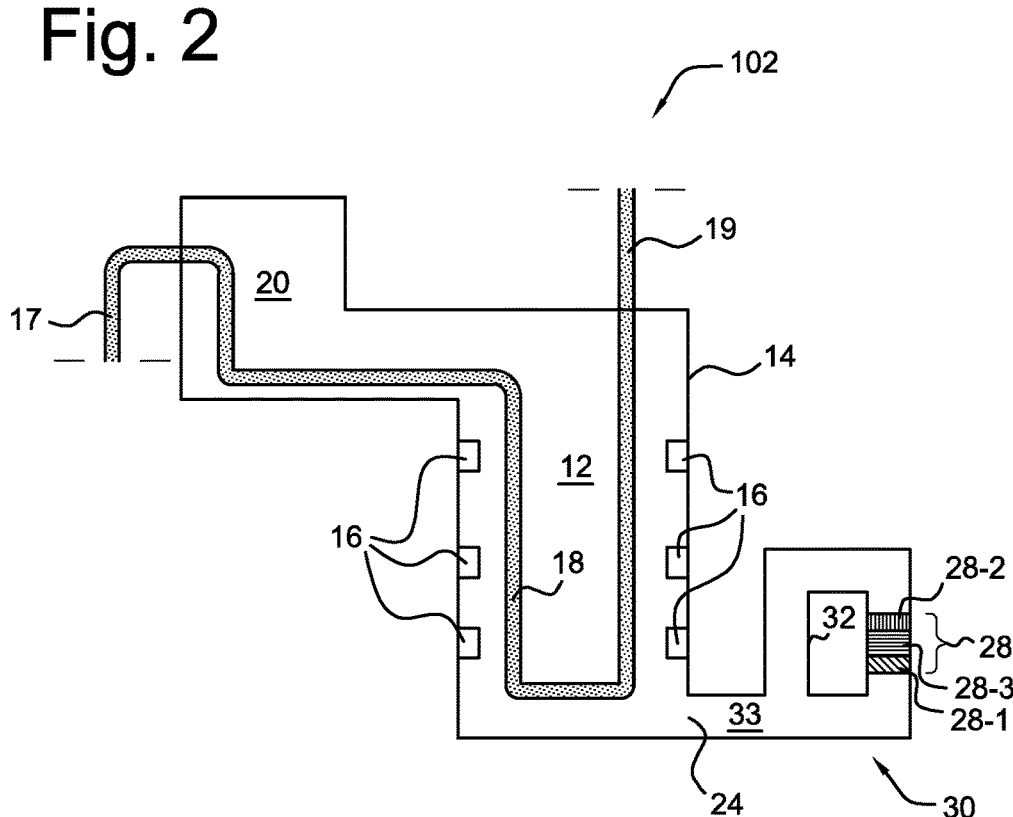
FIG. 2 shows a cross-section of a furnace according to an embodiment.

FIG. 2 shows a cross-section of a furnace 102 according to an embodiment. The furnace 102 is similar to the furnace 100 shown in FIG. 1.

According to the embodiment of FIG. 2, the furnace 102 comprises a thermoacoustic engine 30 for producing acoustic waves. The thermoacoustic engine 30 comprises an acoustic resonator loop 32 and a thermoacoustic core 28 for generating the acoustic waves with the thermoacoustic core arranged inside the acoustic resonator loop 32. The acoustic resonator loop 32 is a tube provided with a branch 33 that is connected to the furnace internal volume through the first opening 24 in a portion of the walls 14 surrounding the furnace internal volume. As described above with reference to FIG. 1, the first opening 24 may be located in the walls surrounding either the high-temperature volume or the lower temperature volume.

The thermoacoustic engine 30 in this embodiment is of a type for producing travelling acoustic waves. The acoustic resonator loop 32 provides an acoustic network comprising an acoustic compliance, an acoustic inertance, and a flow resistance of the regenerator to create the travelling-wave phasing necessary to operate in a Stirling cycle and to feedback part of the acoustic power produced by the thermoacoustic engine 30.

Figures 3, 4:
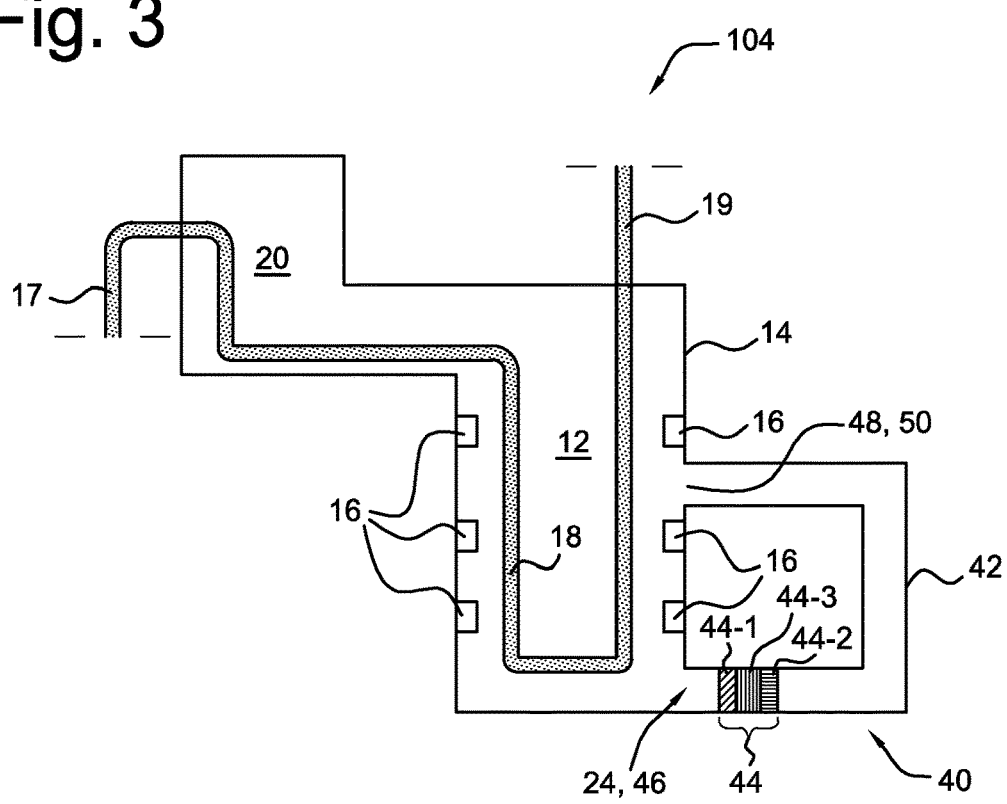
FIG. 3 shows a cross-section of a furnace according to an embodiment.
FIG. 4 shows a cross-section of a furnace according to an embodiment of the invention.

FIG. 3 shows a cross-section of a furnace 104 according to an embodiment.

According to the embodiment of FIG. 3, the furnace 104 comprises a thermoacoustic engine 40 for producing acoustic waves. The thermoacoustic engine 40 comprises an acoustic resonator tube 42 and a thermoacoustic core 44 for generating the acoustic waves with the thermoacoustic core arranged inside the acoustic resonator tube 42. The acoustic resonator tube 42 is arranged in a loop with a first end 46 connected to the high-temperature volume 12 through the first opening 24 in the walls 14 where acoustic waves enter the high-temperature volume 12.

A second end 48 of the acoustic resonator tube 42 is connected to the furnace internal volume through a second opening 50 in the wall of the furnace 104. The first opening 24 and the second opening 50 may each be located in the walls surrounding either the high-temperature volume or the lower temperature volume.

It is noted that according to this embodiment, various arrangements can be made, in which the first opening is in the wall of either the high-temperature volume or the lower temperature volume and the second opening is likewise arranged in the wall of either the high-temperature volume or the lower temperature volume.

As described above with reference to FIG. 1, the thermoacoustic core 44 comprises an arrangement of a high temperature heat exchanger 44-1, a regenerator 44-3 and a low temperature heat exchanger 44-2, with the regenerator positioned between the high temperature heat exchanger and low temperature heat exchanger.

The high temperature heat exchanger 44-1 is positioned at the side of the thermoacoustic core facing the first opening 24.

In a further embodiment, the distance between the high temperature heat exchanger 44-1 and the first opening 24 is designed to be relatively shorter than the distance between the low temperature heat exchanger 44-2 and the second opening 50.

The thermoacoustic engine 40 in this embodiment is of a type for producing travelling acoustic waves. The acoustic resonator loop 42 provides an acoustic network comprising an acoustic compliance, an acoustic inertance, and a flow resistance of the regenerator to create the travelling-wave phasing necessary to operate in a Stirling cycle and to feedback part of the acoustic power produced by the thermoacoustic engine 40.

In the embodiment of FIG. 3, the part of the acoustic resonator tube between the second opening 50 and the low temperature heat exchanger 44-2 of the thermoacoustic core 44 can serve as a feedback path for acoustic waves towards the thermoacoustic core. Acoustic waves produced by the thermoacoustic core 44 enter the high-temperature volume 12 through the first opening 24 and at least partially return through the feedback path to the low temperature heat exchanger 44-2 of the thermoacoustic core 44.

In the embodiment where the first opening 24 is arranged at the level of the high temperature volume, the hot heat exchanger at the side of the radiation zone may be omitted and the hot side of the regenerator 44-3 can be directly heated by radiation and hot gases.

FIG. 4 shows schematically a cross-section of a cracker furnace in accordance with an embodiment of the invention.

According to this embodiment, the one or more tubes 118 within the furnace 114 in which the thermal cracking process takes place are configured to exhibit a temperature gradient (schematically indicated by arrow TG) lengthwise along each tube in the high-temperature volume 112. The flow of hydrocarbon feedstock and cracking products can function as working medium in which the acoustic waves propagate. In this case the temperature gradient TG functions as a source for generating acoustic waves in the flow of hydrocarbons in the tube 118.

Within the furnace 114 the one or more tubes 118 are extending substantially linearly between a first wall 115 and a second wall 116.

In a preferred embodiment to create the volume 112 of the furnace 114 the first wall 115 is arranged opposite the second wall 116, with additional walls 111 extending between the first and second walls.

The one or more tubes each have an entry portion 117 that enters the furnace at the first wall and an exit portion 119 that exits it at the second wall. In a case the tube has a U-shaped layout within the furnace, the entry and exit portions 117, 119 may be arranged in a same wall.

The furnace in this embodiment is configured to create a temperature gradient TG during the cracking process by heating elements 16 along the additional walls 111, such that the one or more tubes are exposed to a temperature gradient: i.e., the configuration causes that the temperature of the wall of each tube varies from a relatively lower temperature T1 (e.g., about 620° C.) in the region at or near the first wall 115 to a relatively higher temperature T2 (e.g., about 850° C.) in the region at or near the second wall 116 along the length of the tube 118.

The temperature gradient along the tube can create oscillating thermo-acoustic waves within the tube, by appropriately dimensioning the tube diameter in combination with the tube length, a high-to-low temperature ratio for the given temperature gradient and a composition of the hydrocarbons to be processed:

As an example: A critical tube diameter d which allows sustaining acoustical oscillations within the tube is given by [Eq.1]

$$d = \frac{4D\alpha^{1+\beta}}{1 + \xi^{-1} + \lambda^2\xi}\sqrt{\frac{lv}{\alpha}} \qquad \text{(Eq. 1)}$$

where v is kinematic viscosity, a is speed of sound, $\alpha$ is the high-to-low temperature ratio according to equation 2

$$\alpha = \frac{T_h}{T_c} \qquad \text{(Eq. 2)}$$

and parameter $\lambda$ is given by equation 3

$$\lambda = \frac{\omega l}{\alpha} \qquad \text{(Eq. 3)}$$

where a is speed of sound, w is the angular frequency and l is the length of low temperature part of the tube. D is a constant function of the thermo-physical parameters of the gas in the tube, and according to equation 4:

$$\xi = \frac{L - l}{l} \qquad \text{(Eq. 4)}$$

where L is the total length of the tube (L=2l).

Equation (1) gives a value of the tube diameter for a given length l for which the acoustic oscillation are sustained in the tube.

Figure 5:
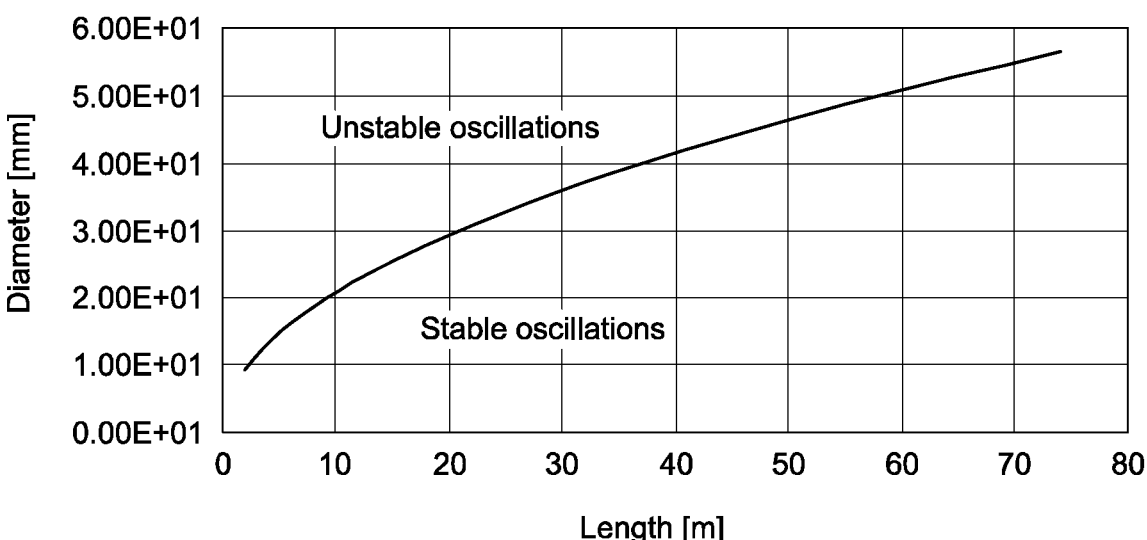
FIG. 5 shows a diagram of the stability-limited length and inner diameter combinations using thermo-physical parameters of naphtha.

Using the known thermo-physical parameters of naphtha a diagram of the stability-limited length and inner diameter combinations is shown in FIG. 5 using T1=620° C. (873K) and T2=850° C. (1023K). The curved line shows the boundary between diameter-length combinations that allow sustained thermo-acoustical oscillations and those that do not.

The skilled in the art will appreciate that according to the embodiment as described above with reference to FIGS. 4 and 5, the layout of the furnace 114 can have any shape provided that a temperature gradient along the length of each tube is producible.

In a further embodiment, the furnace may be designed to provide a course of the temperature in the furnace according to a monotonic increasing function from the first wall to the second wall to create a temperature gradient along the length of the tube.

According to this embodiment, the invention relates also to a method of operation for a furnace configured for cracking hydrocarbons comprising a furnace internal volume and one or more tubes; the furnace internal volume comprising at least a high temperature volume and configured with a heat source for heating the high temperature volume during operation; each tube having an entry portion connectable to an external inlet on one side configured for receiving an input flow of hydrocarbons and an exit portion connectable to an external outlet configured for output of cracked hydrocarbons at another side of the respective tube, each tube arranged to pass through the high temperature volume, such that during operation the tubes in the high temperature volume are exposed to radiative heat; the method comprising: providing the input flow of hydrocarbons at the entry portion to flow towards the exit portion, and providing a temperature gradient over at least a longitudinal portion of each tube between the one side and the other side thereof, in which a tube diameter is configured for causing the tube to generate thermo-acoustical oscillations, with a critical tube diameter value d, which allows sustaining acoustical oscillations within the tube, by dimensioning the tube diameter as a function of the tube length, a high-to-low temperature ratio for the given temperature gradient and a composition of the hydrocarbons so as to generate acoustic waves in the respective tube. Moreover, according to this embodiment, the invention also relates to a method for manufacturing a furnace configured for cracking hydrocarbons comprising: creating at least a furnace internal volume comprising at least a high temperature volume arranged with a heat source;

arranging one or more tubes in the furnace internal volume, each with an entry portion connectable to an external inlet on one side and an exit portion connectable to an external outlet at another side of the respective tube, the one or more tubes configured to pass through the high temperature volume; configuring the furnace internal volume as a generator for providing a temperature gradient over at least a portion of the one or more tubes during operation, in which a tube diameter is configured for causing thermo-acoustical oscillations in the tube by dimensioning the tube diameter as a function of the tube length, a high-to-low temperature ratio for the given temperature gradient and a composition of the hydrocarbons so as to generate acoustic waves within the respective tube.

The skilled in the art will also appreciate that the embodiment as described above with reference to FIGS. 4 and 5 can be implemented in a cracker furnace, but also in a transfer line exchanger device.

Such a transfer line exchanger, TLE, is coupled to the external outlet of the cracker furnace for receiving the hydrocarbon products from the cracker furnace and for cooling the received hydrocarbon products.

According to an embodiment, the TLE is equipped with at least an internal volume comprising one or more tubes extending through the internal volume from an entry point in the TLE to an exit point from the TLE, wherein during operation, the tubes are exposed to a thermal distribution in the internal volume, in which the TLE is configured to have a temperature gradient along at least a portion of a length of the one or more tubes between the entry point of the TLE and the exit point of the TLE, with a temperature of the entry point relatively higher than the temperature of the exit point, and a tube diameter of the one or more tubes in the internal volume of the TLE is dimensioned as a function of the tube length, a high-to-low temperature ratio for the given thermal gradient and a composition of the hydrocarbons such that oscillating acoustic waves are generated in the interior of the respective tube.

Accordingly, the one or more tubes in the TLE can be exposed to acoustic waves generated in the hydrocarbon products flowing through for providing decoking in the internal of the tubes.

The present invention provides that coke deposition during thermal cracking is prevented or counteracted. Accordingly, the reduction of coke deposition will improve the yield and efficiency for the cracking process. Additionally, $CO_2$ emissions from the cracking process will be reduced significantly. This reduction in $CO_2$ emissions is mainly due to the fact that if the coke formation is avoided then the extra energy needed to maintain constant temperature within the tubes in the high-temperature volume (about 5%) and the extra energy needed for decoking (about 2%) are not required anymore and the associated $CO_2$ emissions are avoided. It is also worthwhile to notice that the decoking process which consists of the burning of the coke layer inside the tubes produces an appreciable quantity of $CO_2$ which is also avoided if the coke formation is prevented. Also any downtime of the cracker furnace due to decoking will be reduced which results in longer service life and increase of the production.

The invention has been described with reference to some embodiments. Obvious modifications and alterations will occur to others upon reading and understanding the preceding detailed description. It is intended that the invention be construed as including all such modifications and alterations insofar as they come within the scope of the appended claims.

The invention claimed is:

1. A furnace configured for cracking hydrocarbons comprising a furnace internal volume and one or more tubes;

11 the furnace internal volume comprising at least a high temperature volume and arranged with a heat source configured for heating the high temperature volume during operation;

the tubes, each with an entry portion connectable to an external inlet on one side and an exit portion connectable to an external outlet at another side of the respective tube, arranged to pass through the high temperature volume in the furnace internal volume, such that during operation the tubes in the high temperature volume are exposed to heat from the heat source;

wherein the furnace is an acoustic resonance system having a thermoacoustic engine configured as a source for generating acoustic waves in the furnace internal volume with a frequency of the acoustic waves that substantially corresponds with a resonance frequency of the furnace internal volume, wherein the thermoacoustic engine comprises an acoustic resonator tube and a thermoacoustic core for converting thermal power to acoustic power and generating the acoustic waves, the thermoacoustic core comprising a regenerator body arranged inside the acoustic resonator tube using heat from the furnace internal volume to create a thermal gradient across the regenerator body; a first open end of the acoustic resonator tube being connected to the furnace internal volume through a first opening in a wall of the furnace internal volume.

2. The furnace according to claim 1, wherein the one or more tubes are configured to vibrate in response to the acoustic waves in the furnace internal volume.

3. The furnace according to claim 1, wherein the thermoacoustic core comprises at least a low-temperature heat exchanger and the regenerator body, the regenerator body arranged in-between the first opening and the low-temperature heat exchanger.

4. The furnace according to claim 1, wherein the thermoacoustic core comprises a high-temperature heat exchanger that is arranged in the acoustic resonator tube between the first opening and the regenerator body.

5. The furnace according to claim 1, wherein the acoustic resonator tube is a substantially elongated tube further provided with a closed distal end, such that the thermoacoustic core is arranged between the open end and the closed distal end.

6. The furnace according to claim 1, wherein the acoustic resonator tube comprises a loop portion with a branch thereof connecting with the open end, the thermoacoustic core arranged in the loop portion.

7. The furnace according to claim 1, wherein the acoustic resonator tube is provided with a second open end, the second open end of the acoustic resonator tube being connected to the furnace internal volume through a second opening in a wall of the furnace internal volume.

8. The furnace according to claim 1, wherein the thermoacoustic engine is configured to produce acoustic waves with a frequency substantially corresponding with a resonance frequency of the furnace internal volume determined by acoustical properties of the thermoacoustic engine and the furnace internal volume.

9. A furnace, configured for cracking hydrocarbons comprising at least an internal volume defining a high temperature volume and one or more tubes;

the internal volume comprising at least a high temperature volume;

12 the internal volume arranged with a heat source configured for heating the high temperature volume during operation;

the tubes, each with an entry portion connectable to an external inlet and an exit portion connectable to an external outlet, arranged to pass through the high temperature volume, such that during operation the tubes in the high temperature volume are exposed to heat from the heat source;

wherein the furnace is configured for creating during operation a temperature gradient along at least a portion of a length of the one or more tubes between the entry portion and the exit portion of each tube, with a temperature of the entry portion lower than the temperature of the exit portion, in which a tube diameter is configured for causing the tube to generate thermoacoustical oscillations in the hydrocarbons in the one or more tubes during the cracking process, with a critical tube diameter value d, which allows sustaining acoustical oscillations within the hydrocarbons in the tube, by dimensioning the tube diameter as a function of the tube length, a high-to-low temperature ratio for the given temperature gradient and a composition of the hydrocarbons so as to generate acoustic waves in the respective tube.

10. The furnace according to claim 9, wherein the entry portion is arranged at a first wall of the furnace and the exit portion is arranged at a second wall of the furnace, wherein either the first wall is separated from the second wall and the furnace is configured to create a thermal gradient in the region between the first and second walls during the cracking process, such that a thermal gradient in each tube is created along the length thereof, or the thermal gradient created by the furnace is a temperature difference between the entry portion and the exit portion.

11. A method of operation for the furnace configured for cracking hydrocarbons of claim 1, the method comprising:

providing a thermoacoustic engine coupled to the high-temperature volume and controlling the thermoacoustic engine to generate acoustic waves for transmission into the furnace internal volume for exposing the one or more tubes to the generated acoustic waves, with a frequency of the acoustic waves that substantially corresponds with a resonance frequency of the furnace internal volume.

12. A method for manufacturing the furnace configured for cracking hydrocarbons of claim 1, the method comprising:

creating at least a furnace internal volume comprising at least a high temperature volume arranged with a heat source;

arranging one or more tubes in the furnace internal volume, each with an entry portion connectable to an external inlet on one side and an exit portion connectable to an external outlet at another side of the respective tube, the one or more tubes configured to pass through the high temperature volume; and providing a thermoacoustic engine connected to the furnace internal volume and configured as a source for providing acoustic waves into at least the high temperature volume during operation, so as to expose the one or more tubes to the acoustic waves.

13. A method of operation for the furnace configured for cracking hydrocarbons of claim 9, the method comprising:

providing an input flow of hydrocarbons at the entry portion to flow towards the exit portion; and providing a temperature gradient over at least a longitudinal portion of each tube between opposing sides thereof, in which a tube diameter is configured for causing the tube to generate thermo-acoustical oscillations, with a critical tube diameter value d, which allows sustaining acoustical oscillations within the tube, by dimensioning the tube diameter as a function of the tube length, a high-to-low temperature ratio for the given temperature gradient and a composition of the hydrocarbons so as to generate acoustic waves in the respective tube.

14. A method for manufacturing the furnace configured for cracking hydrocarbons of claim 9, the method comprising:

creating at least an internal volume comprising at least a high temperature volume arranged with a heat source;

arranging one or more tubes in the internal volume, each with an entry portion connectable to an external inlet on one side and an exit portion connectable to an external outlet at another side of the respective tube, the one or more tubes configured to pass through the high temperature volume; and configuring the internal volume as a generator for providing a temperature gradient over at least a portion of the one or more tubes during operation, in which a tube diameter is configured for causing thermo-acoustical oscillations in the tube by dimensioning the tube diameter as a function of the tube length, a high-to-low temperature ratio for the given temperature gradient and a composition of the hydrocarbons so as to generate acoustic waves within the respective tube.

* * * * *